United States Patent
Sugimoto et al.

[11] Patent Number: 6,004,526
[45] Date of Patent: Dec. 21, 1999

[54] PROCESS FOR PREPARING CATHODE ACTIVE MATERIAL FOR LITHIUM SECONDARY BATTERY

[75] Inventors: Akiko Sugimoto; Shintaro Ishida; Kenzo Hanawa, all of Saitama, Japan

[73] Assignee: Mitsui & Mining Company, Ltd., Tokyo, Japan

[21] Appl. No.: 09/149,109

[22] Filed: Sep. 9, 1998

[30] Foreign Application Priority Data

Sep. 30, 1997  [JP]  Japan .................................... 9-266721

[51] Int. Cl.$^6$ .................... C01B 13/14; C01G 13/14; C01G 37/14; C01G 45/02; H01M 4/50
[52] U.S. Cl. .................... 423/605; 423/592; 423/593; 423/596; 429/224
[58] Field of Search .................... 423/605, 592, 423/593, 596; 429/224

[56] References Cited

U.S. PATENT DOCUMENTS

| | | | |
|---|---|---|---|
| 4,921,689 | 5/1990 | Walker et al. | 423/605 |
| 4,980,251 | 12/1990 | Thackeray et al. | 429/224 |
| 5,081,102 | 1/1992 | Gay et al. | 505/1 |
| 5,266,299 | 11/1993 | Tarascon | 429/599 |
| 5,316,877 | 5/1994 | Thackeray et al. | 429/197 |
| 5,370,710 | 12/1994 | Nagaura et al. | 29/623.1 |
| 5,393,622 | 2/1995 | Nitta et al. | 429/223 |
| 5,418,090 | 5/1995 | Koksbang et al. | 429/224 |
| 5,478,672 | 12/1995 | Mitate | 429/194 |
| 5,496,664 | 3/1996 | Sterr | 429/224 |
| 5,506,078 | 4/1996 | Davidson et al. | 429/224 |
| 5,591,546 | 1/1997 | Nagaura | 429/218 |
| 5,702,679 | 12/1997 | Sheargold et al. | 423/599 |

FOREIGN PATENT DOCUMENTS 9-129229  5/1997  Japan .

OTHER PUBLICATIONS

M.M. Thackeray et al., "Lithium Insertion Into Manganese Spinels", pp. 461–472, Mat. Res. Bull., vol. 18, 1983.

J.M. Tarascon et al., "The Spinel Phase of $LiMn_2O_4$ as a cathode in Secondary Lithium Cells", pp. 2859–2864, J. Electrochem. Soc., vol. 138, No. 10, Oct. 1991.

Primary Examiner—Gary P. Straub
Assistant Examiner—Cam N. Nguyen
Attorney, Agent, or Firm—Young & Thompson

[57] ABSTRACT

A process for producing lithium manganate as a cathode active material for lithium secondary batteries comprising firing raw materials at a rate of temperature rise and/or temperature drop of 150° C./min or more.

7 Claims, 11 Drawing Sheets

PROCESS FOR PREPARING CATHODE ACTIVE MATERIAL FOR LITHIUM SECONDARY BATTERY

BACKGROUND OF TE INVENTION

Field of the Invention

The present invention relates to a process for preparing a cathode active material for a lithium secondary battery. More particularly, it relates to a process for preparing a cathode active material for providing lithium secondary batteries with improved performance in a markedly shortened time.

With the recent rapid development of portable and wireless electronic equipment such as personal computers and telephones, the demand for secondary batteries as a driving power source has been increasing. In particular lithium secondary batteries are expected for their smallest size and high energy density. Cathode active materials for lithium secondary batteries meeting the demand include lithium cobaltate ($LiCoO_2$), lithium nickelate ($LiNiO_2$), and lithium manganate ($LiMn_2O_4$). Having an electrode potential of 4 V or higher with respect to lithium, these lithium complex oxides provide lithium secondary batteries having a high energy density.

Compared with $LiNiO_2$ and $LiCoO_2$ having a theoretical capacity of about 280 mAh/g, $LiMn_2O_4$ has a theoretical capacity as low as 135 mAh/g but is deemed suited for use in electric vehicles because of an abundant and inexpensive supply of manganese oxide as a raw material and freedom from such thermal instability in charging as observed with $LiNiO_2$.

Thackeray et al. teach a process for synthesizing $LiMn_2O_4$ which comprises mixing $Mn_2O_3$ and $Li_2CO_3$ at a molar ratio of 2:1 and firing the mixture at 650° C. for 12 hours and then at 850° C. for 24 hours (see Mat. Res. Bull., Vol. 18, pp. 461–472 (1983)). Tarascon et al. propose mixing $Li_2CO_3$ and $MnO_2$ and firing the mixture at 600 to 1100° C. for 48 hours (see J. Electrochem. Soc., Vol. 138, No. 10, pp. 2859–2864 (1991)). These conventional processes are disadvantageous in that the firing time is long, thereby increasing the cost for industrial mass production.

Japanese Patent Laid-Open No. 129229/97 discloses a process for preparing lithium cobaltate, etc. useful as a cathode active material of lithium secondary batteries, in which the rate of temperature drop in the firing step is set at 300° C. min or higher. However, the disclosed technique does not apply to the production of lithium manganate because the reaction mechanism for lithium cobaltate formation and that for lithium manganate differ. More specifically, with respect to raw materials, for example, the publication mentions that materials having a low melting or decomposition point are suitable and, in fact, $Ni(OH)_2$ and LiOH are used in all the working Examples. However, LiOH is unsuitable as a raw material for $LiMn_2O_4$, and $Li_2CO_3$ that is suitable as a raw material for $LiMn_2O_4$ has a decomposition point of 720° C. or lower, which is considerably higher than those of $Ni(OH)_2$ (about 300° C.) or LiOH (420° C.). Further, Ni or Co oxide is an unsuitable material for generation of $LiNiO_2$-based compounds, while $MnO_2$ is suited as a raw material of $LiMn_2O_4$.

SUMMARY OF THE INVENTION

An object of the present invention is to provide an economical process for producing a cathode active material for lithium secondary batteries, which process takes a greatly shortened time without incurring reduction of performance of a battery containing the resulting product.

As a result of extensive studies, the inventors of the present invention have found that the above object is accomplished by setting the rate of temperature rise and/or drop in firing at or above a specific value in the production of a cathode active material having a specific composition.

Completed based on this finding, the present invention provides a process for preparing lithium manganate ($LiMn_2O_4$) as a cathode active material for lithium secondary batteries comprising firing raw materials at a rate of temperature rise and/or drop of 150° C./min or more.

The present invention provides an economically excellent process for producing a lithium manganate cathode active material, achieving a great reduction of firing time without impairing battery performance.

Where the firing is followed by heat treatment under given conditions, further improved battery performance can result in addition to the above effects.

DETAILED DESCRIPTION OF THE INVENTION

In the present invention, lithium manganate ($LiMn_2O_4$) as a cathode active material of lithium secondary batteries is produced by firing raw materials at a rate of temperature rise and/or temperature drop of 150° C./min or more. The lithium manganate obtained in the present invention can have part of manganese thereof displaced with nickel and/or cobalt, and such nickel-and/or cobalt-containing lithium manganate also comes under the scope of the present invention.

Lithium sources which can be used in the present invention include lithium carbonate ($Li_2CO_3$), lithium nitrate ($LiNO_3$), and lithium hydroxide (LiOH).

Manganese sources which can be used in the present invention include manganese dioxide ($MnO_2$), dimanganese trioxide ($Mn_2O_3$), and manganese oxyhydroxide (MnOOH). $MnO_2$ is particularly preferred for the following reasons. Having been used as a positive electrode active material for lithium primary batteries, MnO2 can easily take lithium into its structure. Electrolytic $MnO_2$, in particular, can have a high tap density.

The substance called $MnO_2$ takes several crystal forms, in which pyrolusite is included. Of pyrolusite minerals, those having a high degree of crystallinity have poor reactivity and are not suitable as a raw material in the present invention. Where manganese dioxide is used as a manganese source, it is not preferable to use lithium hydroxide as a lithium source for the following reason. If a mixture of lithium hydroxide and manganese dioxide is fired in a rotary kiln, the mixture considerably adheres to the furnace tube. Besides, secondary batteries using the resulting lithium manganate as a positive electrode active material have reduced performance. Of various lithium and manganese sources, a combination of manganese dioxide and lithium carbonate is the most preferred.

In order to secure larger reactive areas, the lithium and manganese raw materials are preferably ground before or after mixing. The weighed and mixed raw materials can be used as such or as granulated. Granulation methods may be either a wet method or a dry method and include extrusion granulation, rolling granulation, fluidized bed granulation, mixing granulation, spray drying, pressure forming, and flake granulation using a roll.

The mixture is put in a firing furnace set at a predetermined reaction temperature and, while passing through the furnace, converted to a substance identified to be $LiMn_2O_4$ from its X-ray diffraction pattern.

Suitable firing furnaces include a rotary kiln and a stationary furnace. In the present invention, the firing is carried out at a rate of temperature rise and/or temperature drop of 150° C./min or more. If the rate is less than 150° C./min, lithium manganate satisfactory for use as a cathode active material of lithium secondary batteries cannot be obtained.

The rate of temperature rise from room temperature up to the maximum firing temperature and/or the rate of temperature drop from the maximum temperature to room temperature can be controlled by the number of rotation and the angle of inclination of the furnace tube and the feed rate of the raw material mixture. The firing temperature is 650 to 1100° C., preferably 750 to 800° C. In using a rotary kiln, for example, the uniform temperature zone is fixed at 650 to 1100° C., and the time for the raw material mixture to pass through the furnace tube is controlled to achieve the above-described rate of temperature rise or drop. The firing time is usually several minutes to several tens of minutes while somewhat varying depending on other firing conditions.

It is desirable that the temperature rise in the firing be as steep as is consistent with the balance between dispersion and reaction of the raw material mixture. The rate of temperature rise is required to be not less than 150° C./min, preferably 300° C./min or more. If it is less than 150° C./min, the time lag among raw materials in decomposition or melting becomes considerable, and the reaction of the raw materials hardly completes within such a short reaction time as in a rotary kiln. The upper limit of the rate of temperature rise depends on the difference between the raw materials in decomposition or melting temperature. The smaller the difference, the higher can be raised the upper limit.

The temperature drop is desirably as steep as possible, and the rate of temperature drop should be not less than 150° C./min, preferably 300° C./min or more. The upper limit of the rate of temperature drop depends on the heat capacity of the reactive particles and the firing throughput per unit time. Therefore, where the raw materials are granulated, it is necessary to make the particle size as small as is consistent with fluidity.

Where a stationary furnace is used, on the other hand, the above-mentioned rate of temperature rise can be achieved by putting the raw material mixture directly into the furnace by spraying.

It is preferred for the product having been thus fired at a, controlled rate of temperature rise and/or drop to be subsequently subjected to heat treatment at a temperature ranging from 650° to 1100° C. for at least 1 hour, preferably 5 to 10 hours. The heat treatment improves the degree of crystallinity, which can be seen from the X-ray diffraction pattern, so that improvements in battery performance are expected. Since the specific surface area decreases in proportion with the heating time, the heat treatment is effective in preventing moisture adsorption during storage or unnecessary side reactions with an electrolytic solution in a battery. If the treating temperature in the oven is lower than 650° C., the expected reaction does not proceed completely. At temperatures higher than 1100° C., phases other than the desired substance will appear. If the heating time is shorter than 1 hour, the effects in improving crystallinity or reducing the specific surface area are insufficient.

The present invention will now be illustrated in greater detail with reference to the Examples.

EXAMPLE 1

$Li_2CO_3$ and $MnO_2$ were weighed at an Li:Mn molar ratio of 1:2 and mixed in a ball mill together with an adequate amount of balls.

Figures 1, 2:
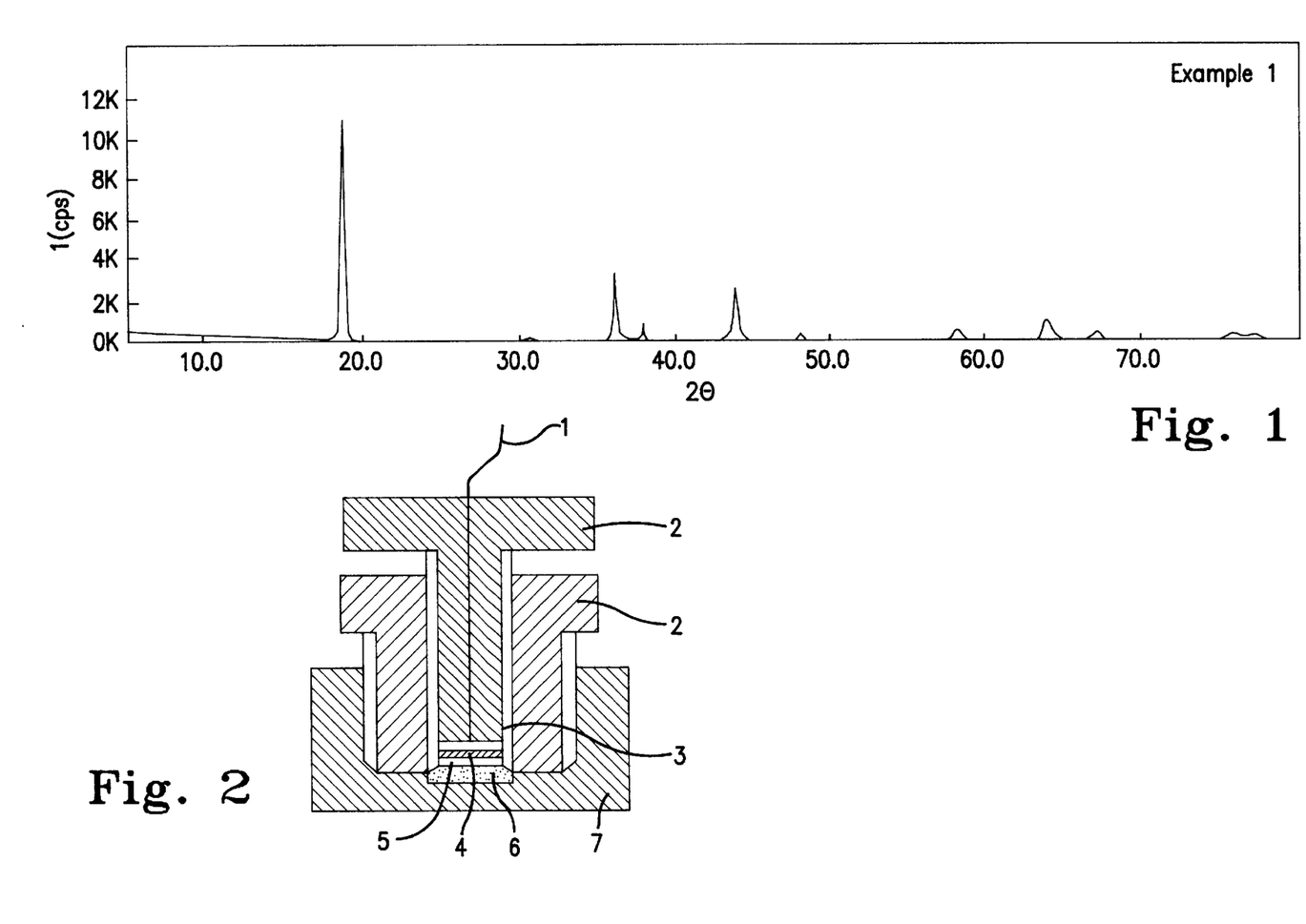
FIG. 1 is an X-ray diffraction pattern of the product ($LiMn_2O_4$) obtained in Example 1.
FIG. 2 is a schematic cross-sectional view of a model cell of a lithium secondary battery used in the evaluation of batteries prepared in Examples and Comparative Examples.

The resulting mixture was fired in a rotary kiln having a furnace tube made of high purity alumina having an inner diameter of 6 cm and a length of 100 cm. The length of the uniform temperature zone was about 40 cm. The furnace tube was inclined at about 1.4°, and the number of rotation was 12 rpm. The mixture was fed to the rotary kiln previously set at 800° C. from the upper part, and the fired product was discharged from the lower part. The average retention time from the feed to the discharge was about 16 minutes, indicating that the rate of temperature rise and drop was about 150° C./min. The X-ray diffraction pattern of the resulting product is shown in FIG. 1. The product was confirmed to be lithium manganate as desired from the positions and intensity ratio of the peaks appearing in the X-ray diffraction pattern.

The resulting lithium manganate (cathode active material), acetylene black, and Teflon (binder) were mixed at a weight ratio of 0.85:0.1:0.05, and the mixture was preliminarily dried at 120° C. for 2 hours to prepare a cathode material mixture. A 0.05 g portion was weighed out of the mixture, uniaxially pressed into a disc having a diameter of 1 cm under a pressure of 3 t, and dried at 200° C. for 2 hours to obtain a pellet as a cathode.

The pellet was set in a model cell shown in FIG. 2, in which a disc of metallic lithium having a diameter of 1 cm was used as an anode, and a 1 mol/l solution of lithium tetrafluoroboron ($LiBF_4$) in a 1:1 (by volume) mixture of propylene carbonate and dimethyl ether was used as an electrolytic solution. Numerals in FIG. 2 indicate the following members. 1: Anode terminal; 2: insulator (Teflon); 3: anode; 4: anode material; 5: separator; 6: cathode pellet; and 7: cathode terminal.

In a battery test a charge and a discharge were carried out at a constant current of 0.882 mA from 4.3 V to 3 V. The open circuit time was 10 minutes.

Figure 3:
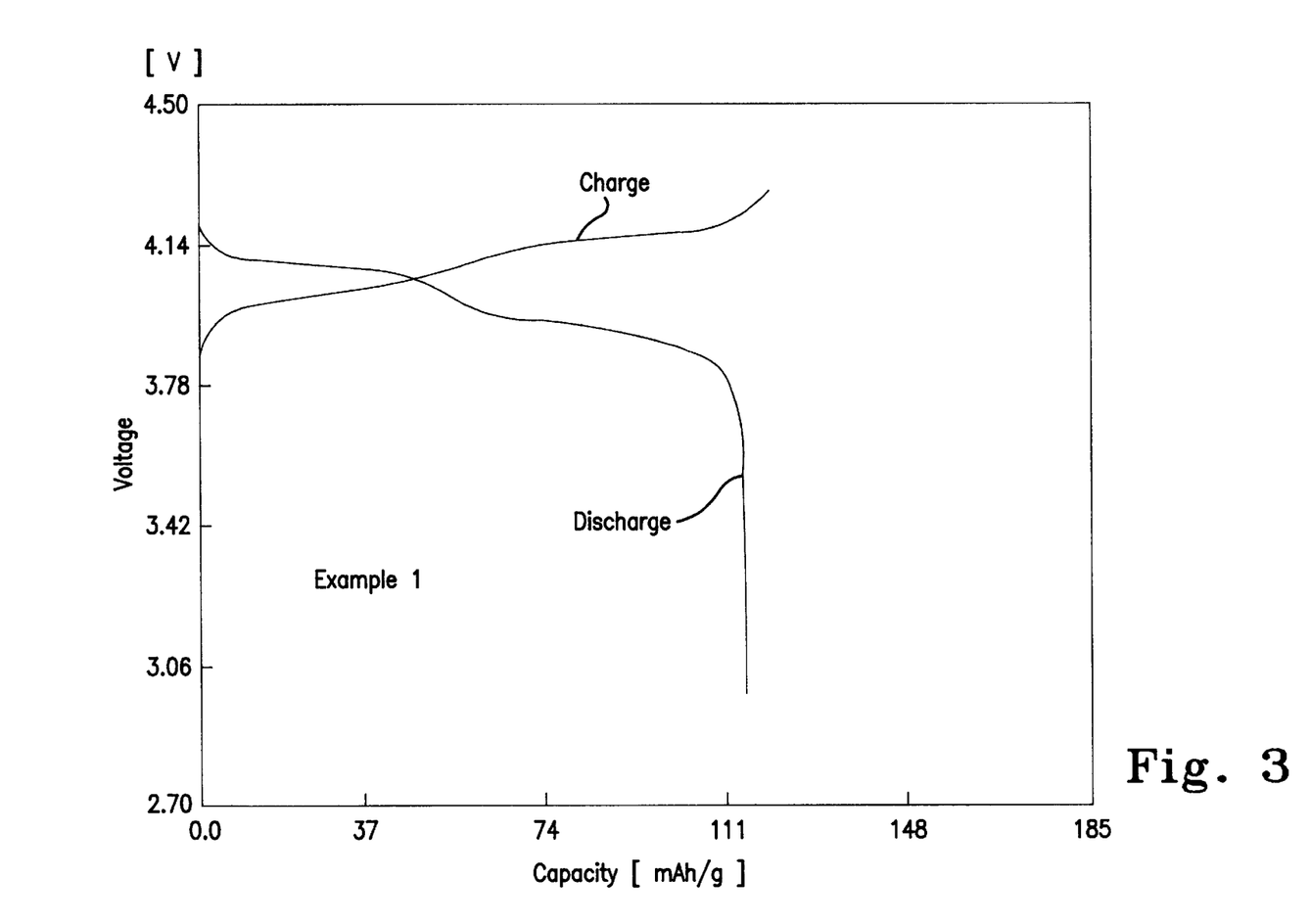
FIG. 3 shows charge and discharge curves of the model cell using the product of Example 1 as a cathode active material.

The charge and discharge curve of the test cell is shown in FIG. 3. The discharge capacity was 111 mAh/g as shown in Table 1.

EXAMPLES 2 TO 4

Figure 4:
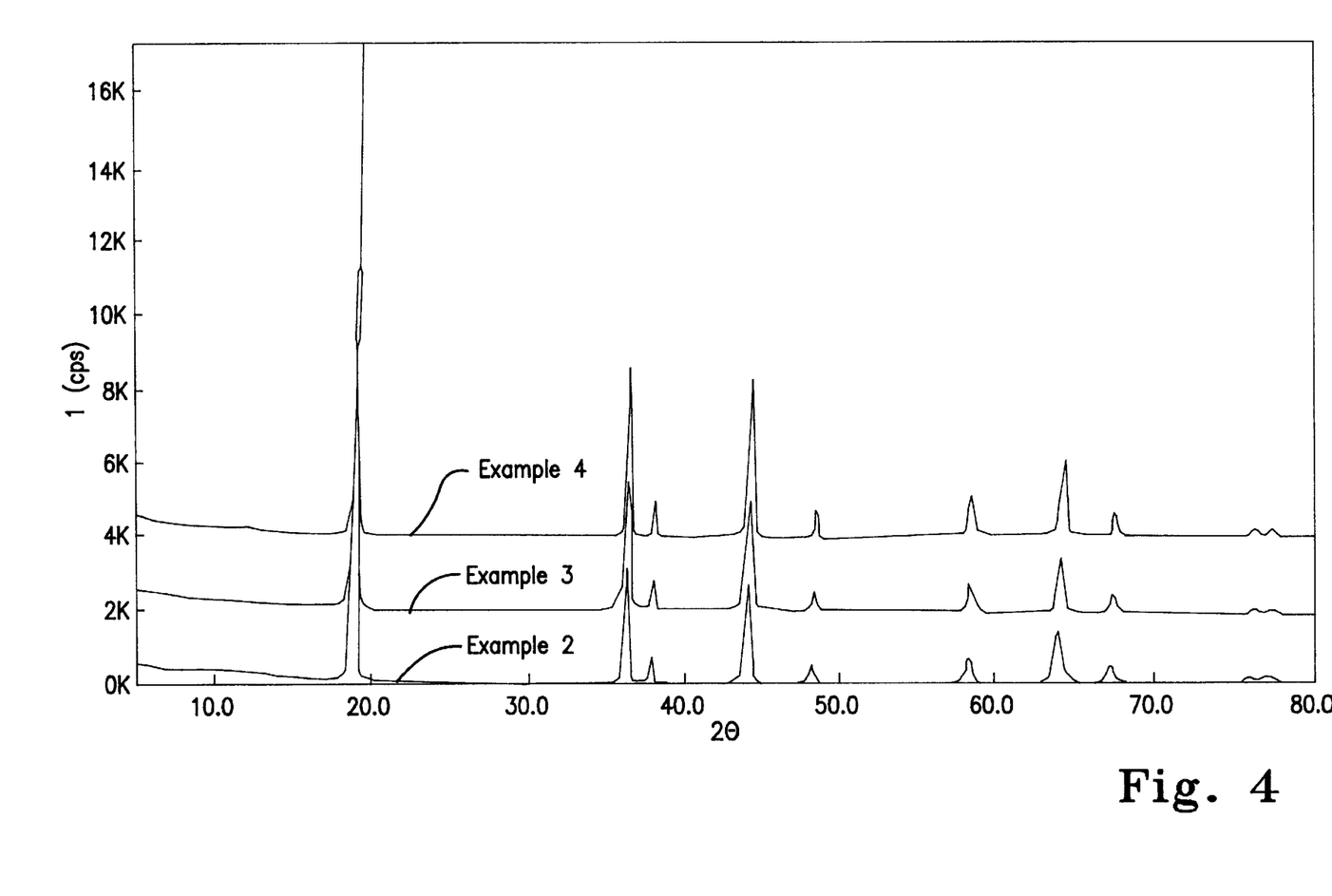
FIG. 4 is an X-ray diffraction pattern of the products ($LiMn_2O_4$) obtained in Examples 2 to 4.
Figure 5:
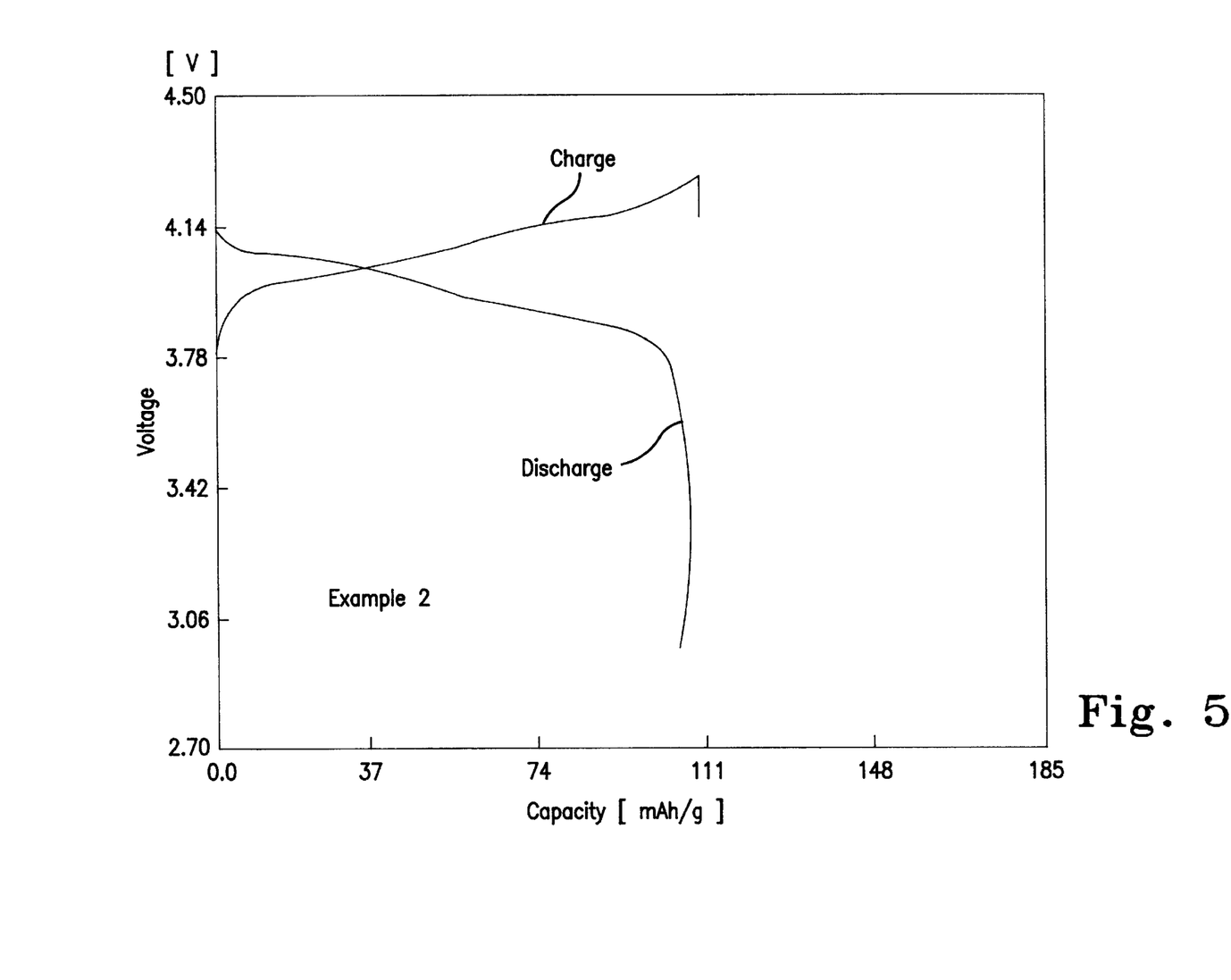
FIG. 5 shows charge and discharge curves of the model cell using the product of Example 2 as a cathode active material.
Figure 6:
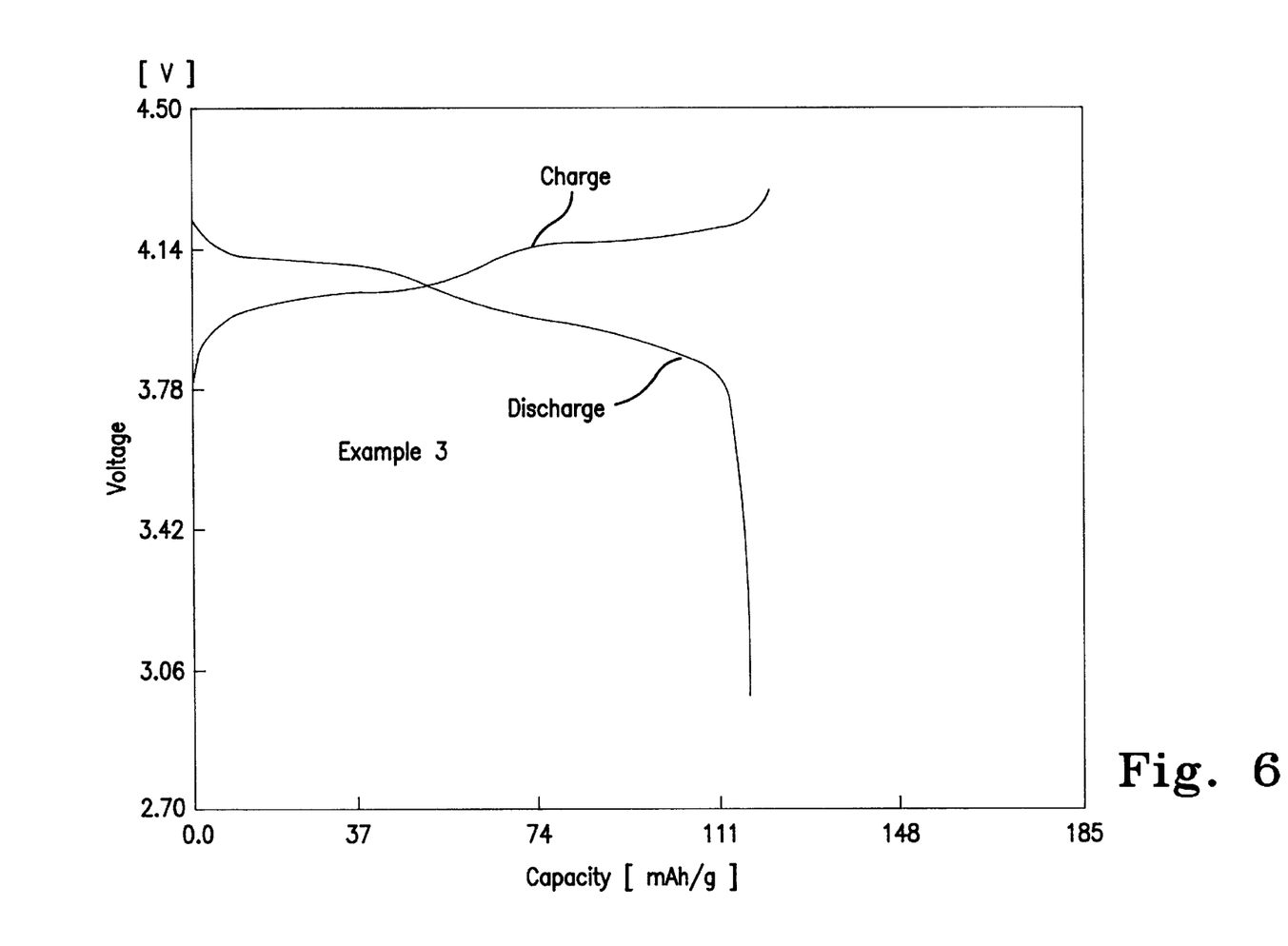
FIG. 6 shows charge and discharge curves of the model cell using the product of Example 3 as a cathode active material.
Figure 7:
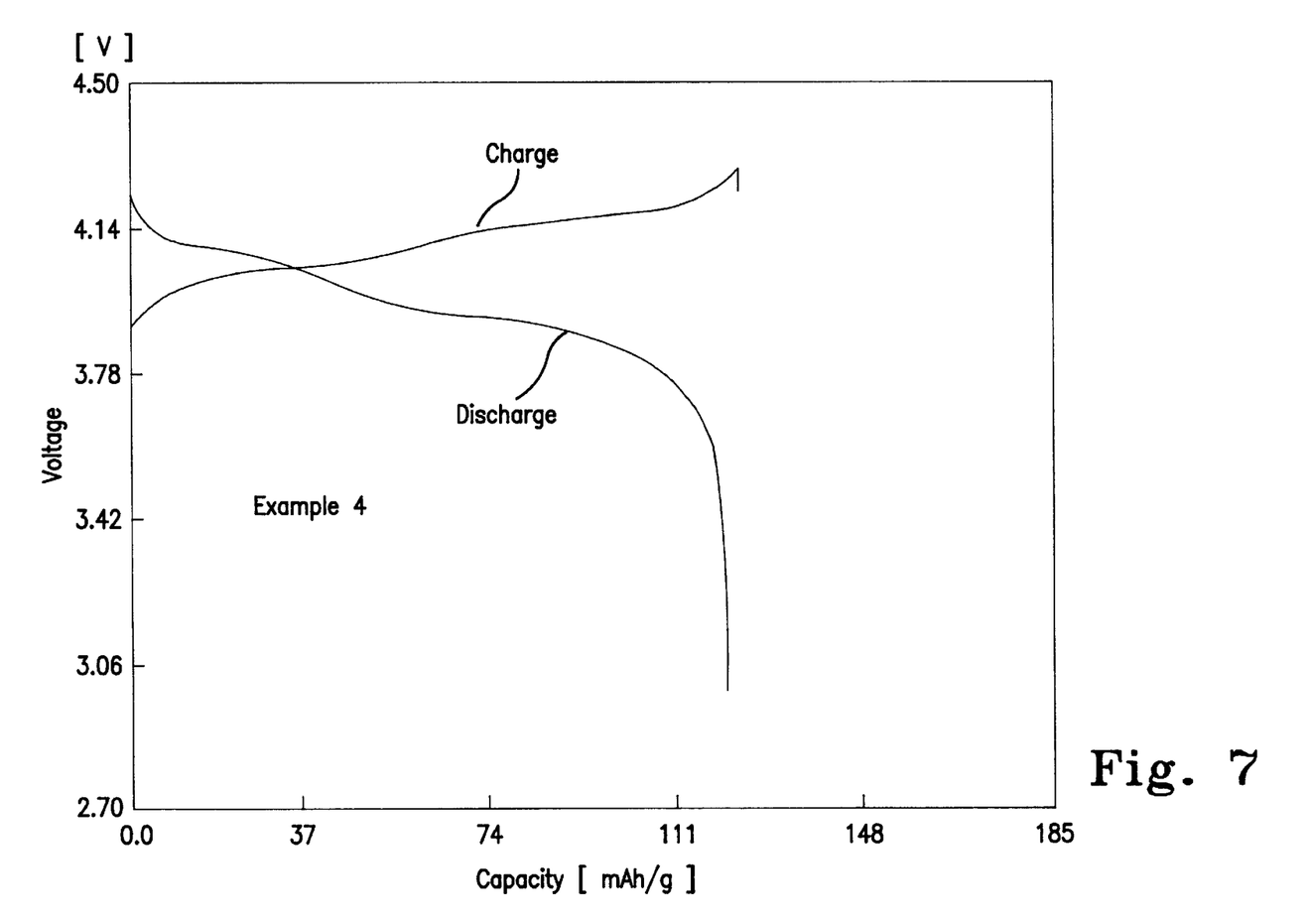
FIG. 7 shows charge and discharge curves of the model cell using the product of Example 4 as a cathode active material.

The procedure of Example 1 was repeated, except that the raw material mixture was fired in the rotary kiln set at 750° C. and subsequently heat-treated in a rotary kiln or a stationary furnace set at 800° C. for a retention time varying from several minutes to 20 hours. The X-ray diffraction pattern of the resulting products is shown in FIG. 4, and the charge and discharge curves of the test cell are shown in FIGS. 5 to 7. The discharge capacity is shown in Table 1.

COMPARATIVE EXAMPLES 1 TO 3

Figure 8:
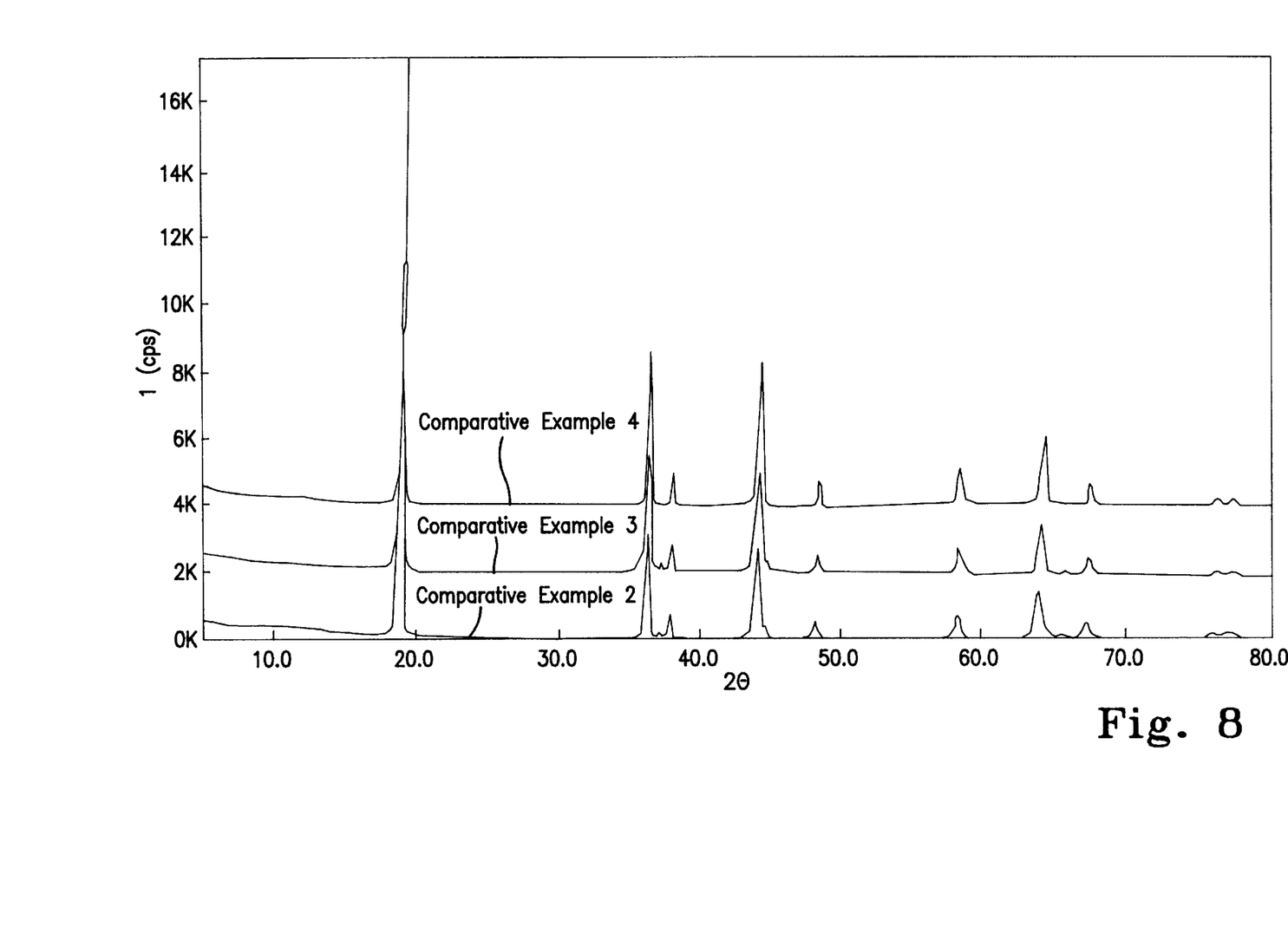
FIG. 8 is an X-ray diffraction pattern of the products ($LiMn_2O_4$) obtained in Comparative Examples 1 to 3.
Figure 9:
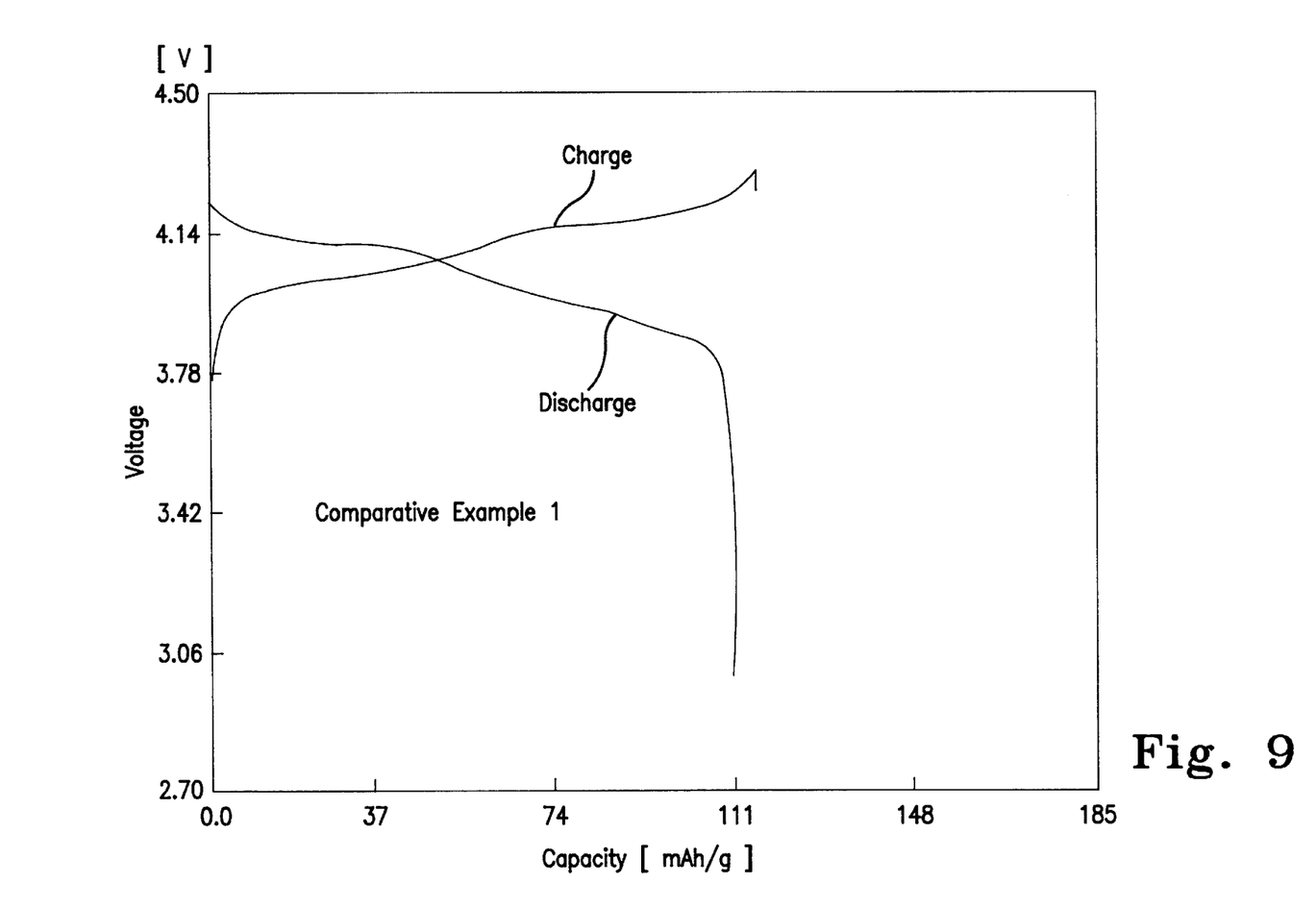
FIG. 9 shows charge and discharge curves of the model cell using the product of Comparative Example 1 as a cathode active material.
Figure 10:
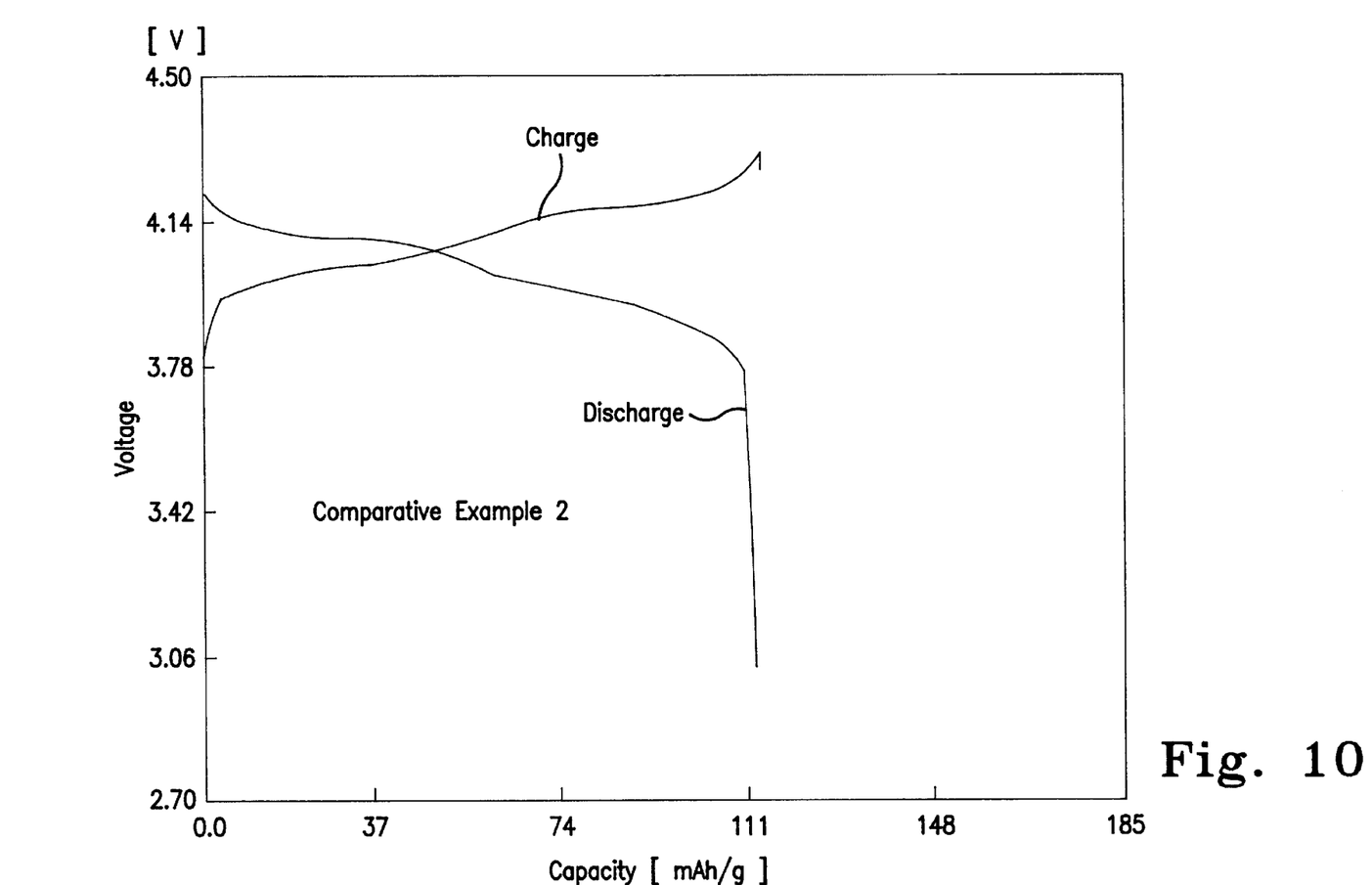
FIG. 10 shows charge and discharge curves of the model cell using the product of Comparative Example 2 as a cathode active material.
Figure 11:
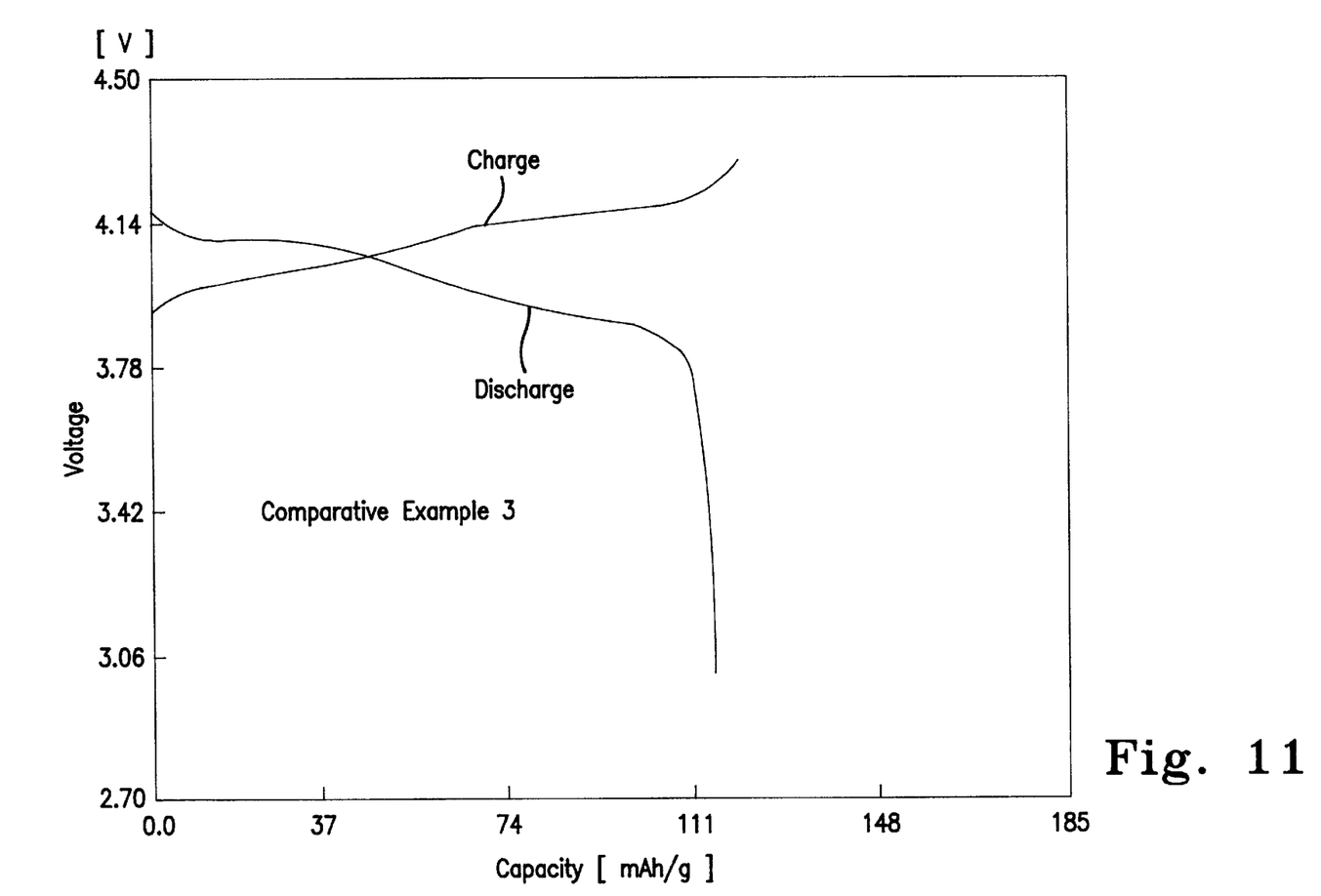
FIG. 11 shows charge and discharge curves of the model cell using the product of Comparative Example 3 as a cathode active material.

The procedures of Examples 2 to 4 were repeated, except that the firing was carried out in a stationary furnace at 750° C. for 5 hours at a rate of temperature rise and drop of about 5° C./min. The total firing time was 10 hours. The X-ray diffraction pattern of the products is shown in FIG. 8, and the charge and discharge curves are shown in FIG. 9 to 11. The discharge capacity is shown in Table 1.

TABLE 1

| | Production Conditions | | Discharge |
|---|---|---|---|
| | Firing | Heat treatment | Capacity (mAh/g) |
| Example 1 | rotary kiln, 800° C. × 16 min | — | 111 |
| Example 2 | rotary kiln, 750° C. × 16 min | rotary kiln, 800° C. × 8 min | 109 |
| Example 3 | rotary kiln, 750° C. × 16 min | stationary furnace, 800° C. × 1 hr | 117 |
| Example 4 | rotary kiln, 750° C. × 16 min | stationary furnace, 800° C. × 20 hrs | 116 |
| Compara. Example 1 | Stationary furnace, 750° C. × 5 hrs | rotary kiln, 800° C. × 8 min | 109 |
| Compara. Example 2 | Stationary furnace, 750° C. × 5 hrs | stationary furnace, 800° C. × 1 hr | 109 |
| Compara. Example 3 | Stationary furnace, 750° C. × 5 hrs | stationary furnace, 800° C. × 20 hrs | 114 |

As is understood from the results in Table 1, the lithium secondary battery containing lithium manganate prepared by firing in a rotary kiln at 800° C. for 16 minutes as a cathode active material exhibits desired characteristics as having a discharge capacity of 111 mAh/g. This result is of great significance from the standpoint of cost and performance, taking it into consideration that the discharge capacity in Comparative Example 1 is 109 mAh/g in spite of the total firing time being 10 hours inclusive of the temperature raising and dropping times. It is thus seen that the present invention achieves marked shortening of the firing time in the preparation of lithium manganate.

In Examples 2 to 4 and Comparative Examples 1 to 3 the time of the heat treatment following the firing was varied. In Examples 3 and 4 in which a rotary kiln was used for the firing, and a stationary furnace was used for carrying out the heat treatment at 800° C. for 1 hour or longer, the battery performance was further improved over Comparative Examples 2 and 3 in which the firing was conducted in a stationary furnace.

TEST EXAMPLE

Figure 12:
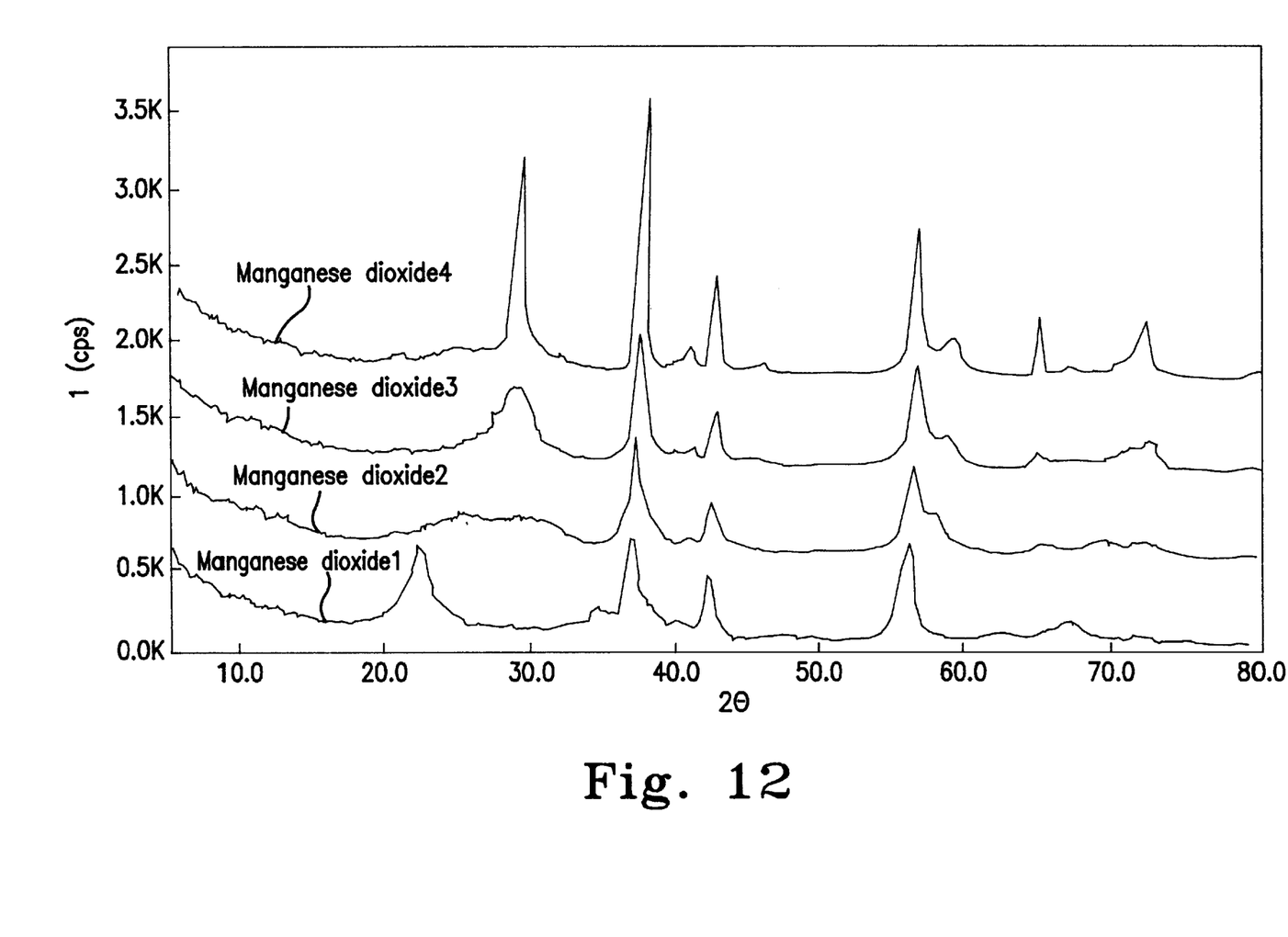
FIG. 12 shows an X-ray diffraction pattern of manganese dioxide ($MnO_2$) species 1 to 4.

Nustite type manganese dioxide which is one of manganese sources is gradually transformed into pyrolusite type manganese dioxide on firing at around 400° C. Four manganese dioxide ($MnO_2$) species 1 to 4, including the intermediates from nustite type to pyrolusite type, whose X-ray diffraction patterns are shown in FIG. 12, were fired together with $Li_2CO_3$ under the same conditions as in Example 1 to obtain lithium manganate. Test cells were prepared using each product to determine the discharge capacity. The results obtained are shown in Table 2 below. $MnO_1$ 1 is the same as that used in Example 1.

TABLE 2

| Species of $MnO_2$ | Full width Half maximum of (110) peak of pyrolusite (deg) | Discharge Capacity (index) |
|---|---|---|
| $MnO_2$ 1 | — | 100 |
| $MnO_2$ 2 | 9.6 | 99 |
| $MnO_2$ 3 | 2.9 | 100 |
| $MnO_2$ 4 | 0.48 | 79 |

It is seen from Table 2 that pyrolusite type manganese dioxide whose full width half maximum the reflection peak on the (110) plane is narrower than 0.7° (i.e., $MnO_2$ 4) is unsuitable as a raw material of lithium manganate positive electrode active material, causing a reduction in discharge capacity.

What is claimed is:

1. An improved process for preparing lithium manganate ($LiMn_2O_4$) in which raw materials for making the lithium manganate are continuously fed through a rotary kiln furnace having a uniform temperature section with a uniform temperature of 650° C. to 1100° C., the improvement comprising the steps of adjusting a rate of movement of the raw materials through said furnace and a temperature gradient at an inlet section leading to the uniform temperature section and at an outlet section leading from the uniform temperature section to heat the raw materials in the inlet section from ambient temperature to the uniform temperature at a rate of not less than 150° C./min before entering the uniform temperature section and then cooled in the outlet section at a rate of not less than 150° C./min from the uniform temperature to ambient temperature after leaving the uniform temperature section.

2. The improved process of claim 1, wherein the raw materials are in the uniform temperature section for a period of time that is less than a combined period of time the raw materials are in the inlet and outlet sections.

3. The improved process of claim 2, wherein the total time period the raw materials are in said furnace is less than 20 minutes.

4. The improved process of claim 1, further comprising the step of subjecting the lithium manganate product to a further heat treatment at a temperature of 600° C. to 1000° C. for at least one hour, following the step of cooling the lithium manganate product in the outlet section.

5. The improved process of claim 4, wherein the raw materials are in said furnace for no more than 20 minutes prior to the further heat treatment.

6. The improved process of claim 1, wherein the uniform temperature is 750° C. to 800° C.

7. The improved process of claim 1, wherein the total time period the raw materials are in said furnace is less than 20 minutes.

* * * * *